United States Patent [19]

LeBras et al.

[11] Patent Number: 5,392,255
[45] Date of Patent: Feb. 21, 1995

[54] WAVELET TRANSFORM METHOD FOR DOWNWARD CONTINUATION IN SEISMIC DATA MIGRATION

[75] Inventors: Ronan J. LeBras; George R. Mellman, both of Kirkland, Wash.

[73] Assignee: Western Atlas International, Houston, Tex.

[21] Appl. No.: 75,939

[22] Filed: Jun. 14, 1993

Related U.S. Application Data

[63] Continuation-in-part of Ser. No. 961,294, Oct. 15, 1992, abandoned.

[51] Int. Cl.$^6$ .............................................. G01V 1/28
[52] U.S. Cl. ...................................... 367/50; 364/421
[58] Field of Search ....................... 367/50, 51, 52, 53, 367/54, 38; 364/421

[56] References Cited

U.S. PATENT DOCUMENTS 4,766,574  8/1988  Whitmore et al. .................... 367/50

OTHER PUBLICATIONS

"A Theory for Multiresolution Signal Decomposition: The Wavelet Representation", *IEEE Transactions on Pattern Analysis and Machine Intelligence*, vol. II, No. 7, Jul. 1989, by Stephane G. Mallat, pp. 674–693.
"Best-Adapted Wave Packet Bases", by Ronald R. Coifman and Mladen Victor Wickerhauser, May 18, 1990, pp. 1–8.
"Cycle-Octave and Related Transforms in Seismic Signal Analysis", *Geoexploration*, 23 (1984/85), by P. Goupillaud A. Grossmann and J. Morlet, pp. 85–103.
"Decomposition of Hardy Functions Into Square Integrable Wavelets of Constant Shape", *SIAM J. Math. Anal.*, vol. 15, No. 4, Jul. 1984, by A Grossmann and J. Morlet, pp. 723–736.
"De-Noising By Soft-Thresholding", Technical Report, No. 409, believed to have been published Dec. 1992, by David L. Donoho, pp. 1–37.
Lecture Notes, American Mathematical Society, Short Course Series, entitled: "Wavelets and Applications", Jan. 11–12, 1993, San Antonio, Texas, Copyright 1992 American Mathematical Society.
"Migration of Seismic Data", published in *Geophysical Signal Analysis*, Chapter 15, pp. 374–398, by Enders A. Robinson and Sven Treitel, published at Englewood Cliffs, N.J., date unknown, but believed to be prior to Jun. 14, 1993.
"Nonlinear Solution of Linear Inverse Problems by Wavelet-Vaquelette Decomposition", Dec. 1991, by David L. Donoho, pp. 1–49.
"Orthonormal Bases of Compactly Supported Wavelets", *Communications on Pure and Applied Mathematics*, vol. XLI, 1988, by Ingrid Daubechies, pp. 909–996.
"Stable Explicit Depth Extrapolation of Seismic Wavefields", *Geophysics*, vol. 56, No. 11, Nov. 1991, by Dave Hale, pp. 1770–1777.
"Stability Versus Accuracy for an Explicit Wavefield", by Samuel H. Gray, Atul Nautiyal, N. D. Whitmore, John D. Garing, pp. 3–17, date unknown, but believed to be prior to Jun. 14, 1993.

(List continued on next page.)

*Primary Examiner*—Ian J. Lobo

[57] ABSTRACT

A depth migration method for seismic data involves a depth migration in the omega-x domain with an added transform in the wavelet domain. The input to the migration is one spike at a given time and x position (or Common Depth Point). This is as if instead of using a collection of seismic traces as input to the processing sequence, traces are used which would be all null except one which contains a spike. The processing sequence involved for seismic traces is the same as the one involved for the spike (or impulse). The only difference is the input itself being the seismic trace rather than the impulse spike.

8 Claims, 7 Drawing Sheets

OTHER PUBLICATIONS

"Unconditional Bases are Optimal Bases for Data Compression and for Statistical Estimation", Technical Report, No. 410, believed to have been published Dec. 1992, by David L. Donoho, pp. 1–23.

"Wavelet Analysis and Signal Processing", by Ronald R. Coifman, Yves Meyer, and Victor Wickerhauser, pp. 153–178, date unknown, but believed to be prior to Jun. 14, 1993.

"Wavelet Shrinkage and W.V.D.: A 10–Minute Tour", by David L. Donoho, pp. 1–12, date unknown, but believed to be prior to Jun. 14, 1993.

"Wavelet Transforms", by William H. Press, Copyright 1991 by Nemerical Recipes Software, pp. 1–9.

"Wavelet Transforms Versus Fourier Transforms", by Gilbert Strang, pp. 1–18, date unknown, but believed to be prior to Jun. 14, 1993.

"Wavelets and Dilation Equations: A Brief Introduction", *Siam Review*, vol. 31, No. 4, published Dec. 1989, pp. 614–627.

"Wavelets and Signal Processing", published in *IEEE SP Magazine*, Oct. 1991, by Olivier Rioul and Martin Vetterli, pp. 14–38.

"Wavelets in Numerical Analysis", by G. Beylkin, R. Coifman, and V. Rokhlin, pp. 181–210, date unknown, but believed to be prior to Jun. 14, 1993.

"Wavelets and Seismic Interpretation", by J. L. Larsonneur and J. Morlet, pp. 126–131, date unknown, but believed to be prior to Jun. 14, 1993.

WAVELET TRANSFORM METHOD FOR DOWNWARD CONTINUATION IN SEISMIC DATA MIGRATION

This is a continuation in part of application Ser. No. 07/961,294, filed Oct. 15, 1992, now abandoned.

FIELD OF THE INVENTION

The present invention relates generally to the field of seismic data migration and, more particularly, to a method of solving the downward continuation problem in seismic data migration and thereby reducing computation overhead by using wavelet transforms.

BACKGROUND OF THE INVENTION

The present invention relates to a method to migrate seismic time/amplitude data into depth/amplitude data. As explained by Robinson and Treitel in *geophysical signal analysis*, at page 374, the process by which the apparent dips in a seismic record section are converted to time dips is known as migration. As explained on page 378 of *geophysical signal analysis*, migration is the process of constructing the reflector surface (the actual interface of an underground geologic structure that produces a reflection) from the record surface (the surface defined by reflections before accounting for slope). More specifically, depth migration may also be viewed as the process of placing reflection events recorded in the seismic data at their proper spatial location. This is a computationally intensive process especially when the velocity field varies laterally at any given depth. The present invention relates to improving the computation speed of depth migration using wavelet analysis.

The term "downward continuation" is a term known in the art. Downward continuation is the computation of the wavefield, knowing its value at a known depth (e.g., depth=z=0), down to any given depth, using the wave equation. That is, downward continuation is the computation of the wavefield from where it is known, on the surface, to where it has not been recorded, at some depth within the earth, assuming some velocity model. In the following description of the present invention, we have chosen to use the explicit formulation of the downward continuation operator from depth z to depth z+Δz, expressed in the wavelet space.

The seismic imaging art includes a variety of techniques for improving definition in the seismic image. For example, Whitmore, Jr. et al., U.S. Pat. No. 4,766,574, relates to a method for imaging multi-component seismic data to obtain better depth images of the earth's subsurface geological structure as well as better estimates of compressional and shear wave interval velocities. FIG. 10 of Whitmore, Jr. et al. depicts a generalized process flow diagram. The present invention provides a new method for processing seismic data that would find application in step 50 in FIG. 10. In Whitmore, Jr. et al., the combination of equation (3), the imaging principle, and equations (4) and (5), wavefield continuation, constitutes depth migration, as undertaken at step 50 of FIG. 10. The incident and reflected wavefield are mathematically continued down (i.e., the downward continuation problem) into the earth's subsurface via equations (4) and (5) and a reflectivity is computed from equation (3). The migration process as contemplated by Whitmore, Jr. et al. and other known migration techniques is extremely calculation intensive when the velocity field varies laterally at a given depth and is consequently time consuming. It should be noted that the present invention is generally applicable to depth migration, independent of Whitmore, Jr. et al., but that Whitmore, Jr. et al. would benefit significantly from the application of the present invention to their step 50.

The present invention utilizes wavelet transforms and the wavelet space to perform the calculations of the downward continuation (or migration) process. Wavelet analysis is a relatively recently developed field of mathematical and signal analysis. The literature is now abundant in applications of wavelet transforms in the field of image processing, speech processing, and telecommunications. In contrast, the literature is sparse in geophysics.

Geophysicists generally use the term "wavelet" to refer to the waveform containing the seismic source characteristics. In the context of wavelet analysis, the word "wavelet" refers to families of mathematical functions obtained by translation (usually by an integer) and dilation (usually by powers of two) of a single function. (As used herein, the term "translation" refers to the movement of the center time of the wavelet function and the terms "dilation" and "contraction" refer to the adjustment of the width of the wavelet.) The following discussion introduces the scaling function and wavelets of wavelet analysis.

A family of functions $\Phi_{nk}$, whose integral is unity, is generated from a single function $\Phi$, by dilation or contraction by powers of two as well as translation, through the relation:

$$\Phi_{nk}(x) = 2^{-n/2}\Phi(x/2^n - k) \tag{1}$$

$\Phi$ is called a scaling function. The scaling function satisfies the relation:

$$\Phi(x) = \Sigma_k a_k \Phi(2x - k) \tag{2}$$

$\Phi$ is compactly supported (as that term is known from Daubechies, *Orthonormal Bases of Compactly Supported Wavelets*, Communication of Pure and Applied Mathematics, Vol. XLI, pp. 909–996), or identically zero outside of a finite length interval when a finite number of $a_k$ coefficients is non-zero. The wavelet is an associated function whose integral is zero. It is obtained through:

$$\Psi(x) = \Sigma_k (-1)^k a_{1-k} \Phi(2x - k) \tag{3}$$

In a manner similar to the family of functions defined in equation (1), $\Psi_{nk}$ functions are generated from $\Psi$ by dilation and translation. It has been demonstrated that, for some choices of the $a_k$ coefficients, the $\Psi_{nk}$ functions form an orthonormal basis for square integrahie functions on the real axis. A discrete wavelet transform is the mapping of any square integrahie function f into its wavelet coefficients:

$$f(x) = \Sigma_{nk}(f, \Psi_{nk})\Psi_{nk}(x) \tag{4 where:}$$

$$f_{nk} = (f, \Psi_{nk}) = \int f(x)\Psi_{nk}(x)dx \tag{5}$$

are the wavelet coefficients. The integers n and k span the whole range of integers.

Thus, the word "wavelet" refers to families of mathematical functions obtained by translation and dilation of a single function, possessing in addition the property of generating a basis for the space of square integrable functions. For further explanation of wavelet transforms, consider *Lecture Notes from the American Mathematical Society Short Course Series on Wavelet and Applications,* Jan. 11-12, 1993, San Antonio, Tex.

As described in Wavelets and Signal Processing, O. Rioul and M. Vetterli, IEEE SP Magazine, October, 1991, the wavelet transform (WT) provides an alternative to the short-time Fourier transform (STFT). In contrast to the STFT, which uses a single analysis window, the WT uses short windows at high frequencies and long windows at low frequencies (i.e., dilations and contractions), thus providing constant relative bandwidth frequency analysis. It may be desirable to see the WT as a signal decomposition onto a set of basis functions. They are obtained from a single prototype wavelet by dilations and contractions (scaling) as well as shifts or translations.

The set of coefficients corresponding to one given level n (Equation 5) can be interpreted as a projection of f onto a subspace $W_n$ of square integrable functions. (As used herein, the term "level" will best be understood with reference to FIG. 5 and the discussion below with regard to that figure.) $W_n$ is generated by the $\Psi_{nk}$ functions. The related subspace $V_n$ is generated by the associated $\Psi_{nk}$ functions. The two subspaces are disjoint and their direct sum (or union) is $V_{n-1}$, the subspace at the finer scale. The projection of f onto $V_n$ where n is decreasing may be intuitively interpreted as a finer and finer approximation of f.

Thus, the projection of a function at a given level may be decomposed into a smoothly varying part containing its broad features (i.e., the low frequency part), and a high frequency part with its sharp features (or edges).

Daubechies, in *Orthonormal Bases of Compactly Supported Wavelets, Communication of Pure and Applied Mathematics,* Vol. XLI, pp. 909-996, studies a family of such wavelets with the properties of compact support ($\Phi$ and $\Psi$ vanish outside of a finite interval) and orthonormality. The computation of the coefficients $h_{nk}$, which constitute the wavelet transform, may be obtained efficiently, without evaluating the integral in equation (5), above. The cost of the transform (i.e., the computation overhead) is proportional to N, where N is the number of points of the input data.

Thus, the depth migration process being computationally intensive, there is a need to reduce the number of data points that must be analyzed to provide an adequate seismic image to thereby reduce time and cost involved. Wavelet analysis provides this reduction in the number of data points needed in the analysis.

SUMMARY OF THE INVENTION

The present invention provides these and other advantages by using wavelet transforms. Wavelet transforms allow efficient analysis of signals in one or more dimensions. The signals may be expressed at different scales of resolution. This provides schemes for compression of information in image and speech processing. The mathematical framework of wavelet analysis is well grounded in theoretical works and the computation of wavelet transforms is based on an efficient iterative technique.

The present invention deals with the use of a wavelet transform in the downward continuation problem for acoustic wave propagation used in seismic data processing. The operators for a constant velocity medium are expressed using one or more levels of the wavelet transform. The wavelet representation of this operator for a selected accuracy is sparser than its space representation (i.e., it can be represented accurately with significantly fewer coefficients). The different parts of the impulse response wavefield, corresponding to the levels of decomposition in the wavelet space operator, are obtained separately and illustrate the separation of its different dip components between the different levels.

We have found that, for the same accuracy, the downward continuation operator with wavelet transform applied can be approximated with fewer coefficients than without application of the wavelet transform. Seismic data is often slowly varying as a function of horizontal spatial variables. This suggests that very efficient downward continuation may be obtained by separating seismic wavefields using wavelet analysis. This leads to efficient data adaptive algorithms where only the dominant parts of the wavefield are downward continued. This saves computing time in processing seismic data.

In other words, the present invention relates to a method of seismic data processing. The process includes applying a wavelet transform to a velocity field downward continuation operator to obtain a wavelet representation. For a given level of accuracy, this wavelet representation is sparser (i.e., fewer data points) than its space representation, thereby obtaining significant reduction in data for subsequent processing in order to display a geologic structure. The different parts of the impulse response wavefield, corresponding to the levels of the wavelet transform are separated and illustrate the dominance of the slowly varying (low frequency) part of the wavefield.

In the present invention, the downward continuation operator (in the wavelet domain) is defined by applying a wavelet transform to a downward continuation operator. To speed the computation process, the present invention involves the steps of: (a) applying a wavelet transform to all frequency components of a downward continuation operator and keeping coefficients larger than a specified limit (or predefined level of accuracy) to define a downward continuation operator in the wavelet domain; (b) applying a wavelet transform on the spatial dimension to a collection of trace response functions, after the time/amplitude traces have been transformed through a standard fast Fourier transform method into frequency/amplitude traces and keeping coefficients larger than a specified limit (or predefined accuracy); (c) applying the operator obtained in step (1) for each frequency component to the traces obtained in step (2) to define a resultant collection of transformed traces in the wavelet domain for all desired depths; (d) applying the inverse wavelet transform on the spatial dimension, defining the downward continued field in the spatial domain; (e) summing all frequency components at all depths to define the resulting depth/amplitude data; and (f) displaying the amplitude of the resultant data as a function of depth. By defining and applying a downward continuation operator in the wavelet domain in this way, the time required to process seismic data is significantly reduced.

The above and other features and advantages of the present invention may best be understood by reference to the following detailed description when taken in conjunction with the accompanying drawings in which:

BRIEF DESCRIPTION OF THE DRAWINGS

FIG. 7a is an illustration of a migration obtained for a seismic line where the threshold was placed at 0.1 percent for the operators and 1 percent for the data. The cost of this section is three times as high as the section on FIG. 6a.

DETAILED DESCRIPTION OF A PREFERRED EMBODIMENT

Introduction—The Dominance Of Low
Frequency Components Of The Impulse Response

The wavelets discovered by Daubechies, noted above, are very closely related to finite impulse response ("FIR") quadrature mirror filters. In the present invention, wavelet transforms are used to obtain sparser representations of the downward acoustic propagation operators in two dimensions. Combined with the fact that the seismic data compresses under a wavelet representation, the application of such operators to image seismic lines is more efficient in that domain.

Hale, in *Stable Explicit Depth Extrapolation of Seismic Wavefields*, Geophysics, vol. 56, no. 11, pp. 1770–1777, 1991, discusses stability and accuracy of acoustic downward continuation operators represented by FIR filters. The filters are estimated in the frequency-space domain. The theoretical downward continuation operator in frequency and horizontal wave number for a constant velocity layer is of the form:

$$D(\omega,k) = \exp\{i(\Delta z/\Delta x) \sqrt{(\omega\Delta x/v)^2 - k^2}\ \} \quad (6)$$

where $\omega$ denotes frequency, v velocity, and $\Delta x$ and $\Delta z$ the horizontal and vertical spatial increments, respectively.

The above noted Hale reference evaluates the coefficients of an FIR filter by constraining the horizontal wave number spectrum of the filter to fit the theoretical response for a wave number smaller than the evanescent wave number and to vanish beyond the evanescent wave number. The operator may be expressed in the frequency-space domain:

$$D(\omega,x) = i \frac{(\omega/2v)(\Delta z/\Delta x)}{\{(x/\Delta x)^2 + (\Delta z/\Delta x)^2\}^{\frac{1}{2}}} \times \quad (7)$$

$$H_1{}^1[(\omega\Delta x/v)\{(x/\Delta x)^2 + (\Delta z/\Delta x)^2\}^{\frac{1}{2}}]$$

where $H_1{}^1$ is a Hankel function. When an FIR filter is obtained by estimating this function at discrete equally spaced points in x between 0 and a maximum radius, artifacts result due to the truncation at that radius. One may use a tapered version of the function defined in equation (7), as suggested by Nautiyal et al., in Stability Versus Accuracy For An Explicit Wavefield Extrapolation Operator, Geophysics, vol. 58, pp. 277–283, to suppress these artifacts. There is an assumption common to all the previously noted studies, which is to assume that the operator for constant velocity may be applied to a velocity varying medium by simply using the operator at point x corresponding to the velocity at that point. This assumption has been shown to be valid and is commonly used. For a medium with no lateral variations of velocity, application of the operator in the frequency-wavenumber domain is optimally efficient, since the operator is then simply a multiplication for each wavenumber value. In the space domain, application of the operator is time consuming since it consists in a convolution for each frequency component.

The wavelet domain is intermediate between space and wavenumber in the sense that individual wavelets are localized both in space and wavenumber, and thus the wavelet space will provide a more efficient domain than the space domain to perform the computation while keeping the spatial localization necessary to adapt to a variable velocity medium.

In this disclosure, the downward continuation operator in the spatial domain is a two dimensional operator with a symmetric circulant matrix structure. The wavelet transform of this two dimensional object is the tensor product of the transforms for each dimension. The wavelet transform can be taken any number of levels down from the finest discretization available for a constant velocity layer. The example provided below illustrates the case of an operator taken one level down. This operator can be represented as a matrix composed of four submatrices each corresponding to a combination of the "low frequency" L and "high frequency" H parts of the wavelet transform on each of the dimensions of the matrix. These submatrices are noted in FIG. 1 as LL, HL, LH, and HH. LL and HH are symmetric banded matrices; LH and HL are the transpose of each other.

Figure 1:
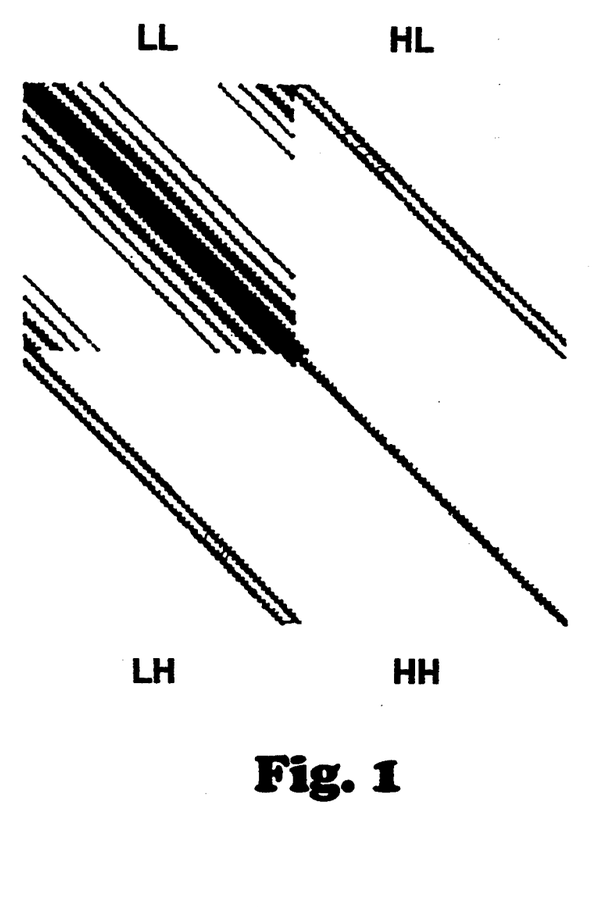
FIG. 1 is a schematic representation of a downward continuation matrix after one level wavelet transform for a normalized frequency of 0.2.

FIG. 1 presents an example of the downward continuation operator for normalized frequency 0.2 (fΔ=0.2). (Normalized frequency is frequency by step size in x divided by velocity.) A FIG. 1 clearly shows, the amplitudes of the off-diagonal submatrices (HL and LH) are small compared to the diagonal submatrices. LL is the dominant submatrix at that frequency. The wavelet used in this calculation is a four point Daubechies wavelet. FIG. 1 illustrates the sparseness of the downward continuation operator in the wavelet domain for this frequency.

Figure 1A:
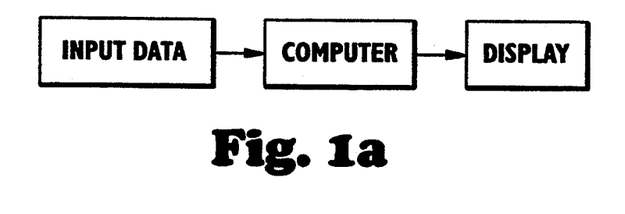
FIG. 1a is a simplified block diagram of the apparatus to carry out the method of the present invention.

As shown in FIG. 1 a, the method of the present invention is optimally carried out on a digital computer.

Figure 2:
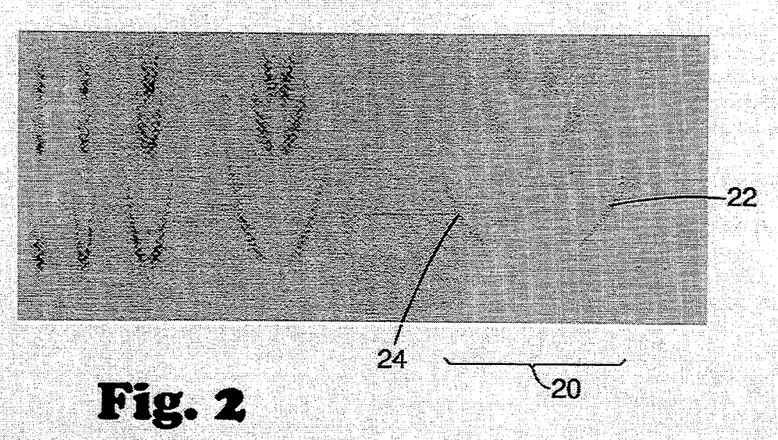
FIG. 2 is a schematic representation of impulse responses for three impulses for each of the five subfields of a four-level wavelet transform.

FIG. 2 shows the impulse responses in the wavelet domain for a four levels decomposition. The five subfields are the low frequency part at four levels down and the high frequency parts at five, four, three, two, and one level down. The grid is 256 by 256 in the wavelet transformed x and z coordinates. The input consisted of three impulses with a cosine taper ($\cos \pi f + 1$, $0 \leq f \leq 1$) amplitude spectrum. The figure has five parts corresponding, starting from the left, to the low frequency part at four levels down, the high frequency part at four levels down, and the high frequency parts at three, two, and one level down. The "high frequency" components of the impulse responses are of lower amplitude and contain the "sides" 22 and 24 of the impulse responses, for example impulse responses 20, but not the horizontal component (at the apex of the impulse responses). This means that for data with few strongly dipping (away from horizontal) components, only the lower level parts of the operators need to be used, which represents significant saving in computation time.

Figure 3:
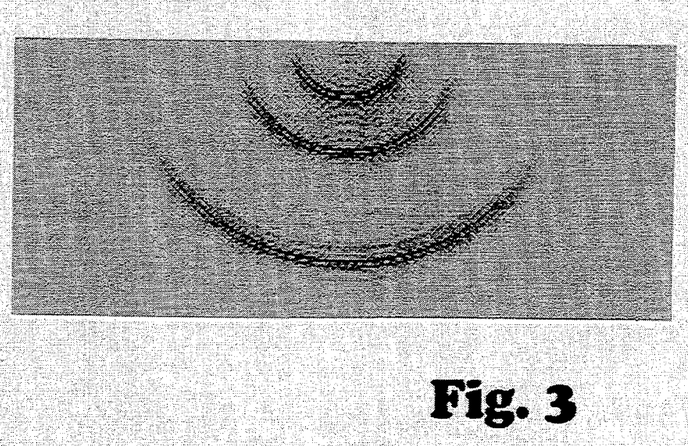
FIG. 3 is a schematic representation of the impulse response reconstructed from the five subfields of FIG. 2.

FIG. 3 shows the impulse responses of FIG. 2 reconstructed in the spatial domain. The grid is 256 by 256 in the x and z coordinates. The reconstruction involved doing an inverse wavelet transform for each depth.

We have shown that the wavelet transformed downward continuation operator is dominated by its "low frequency" part for horizontal components. The high frequency part on most seismic data is sparse because of the relatively slowly varying nature of seismic data along the x direction. This leads to efficient data adaptive algorithms where only the dominant parts of the high frequency part of the wavelet transform of the wavefield are downward continued. This saves computing time in processing seismic data. To see how this is done, one must understand step by step how a discrete wavelet transform is performed on a series of points t(i) where i varies from 1 to $2^N$ and as shown in FIG. 5.

Figure 5:
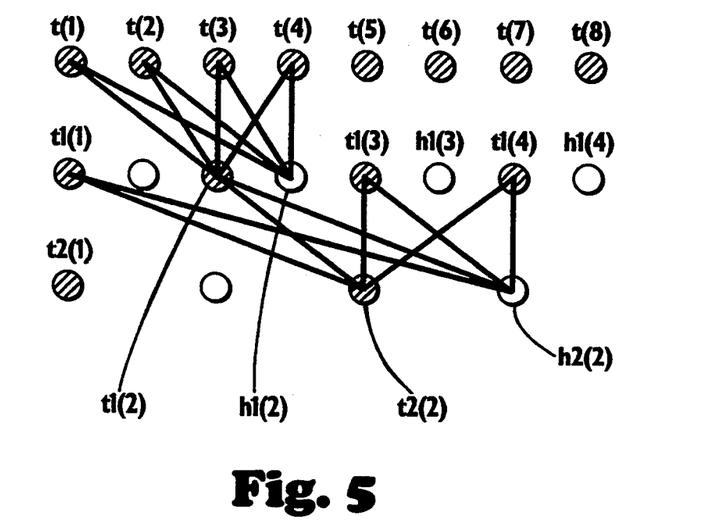
FIG. 5 is a schematic representation of the computation of eight-coefficients wavelet transform of a series over two levels.
Figure 6A:
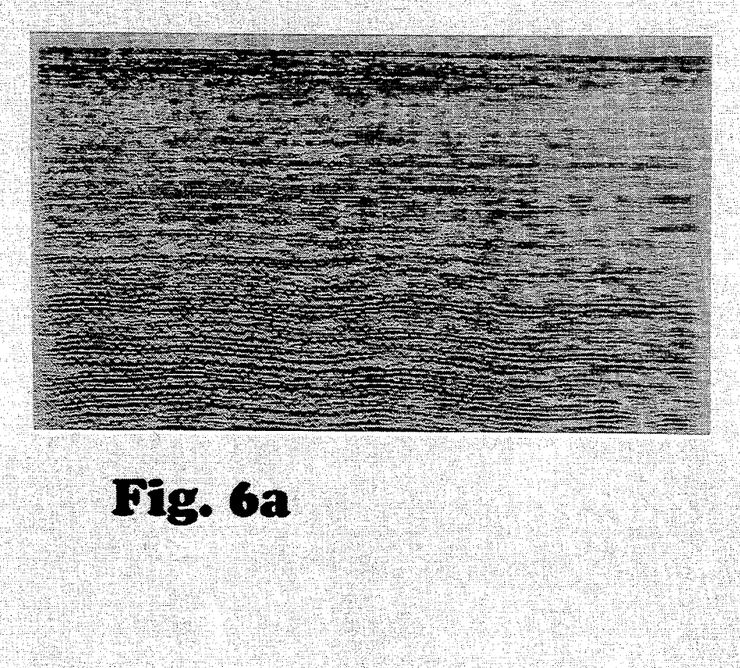
FIG. 6a is an illustration of a migration obtained for a seismic line where the threshold for keeping coefficients of the operator and the data is placed at a value of 1 percent of the maximum of the operator for each frequency and 1 percent on the maximum value of the spectrum for the data.
Figure 6B:
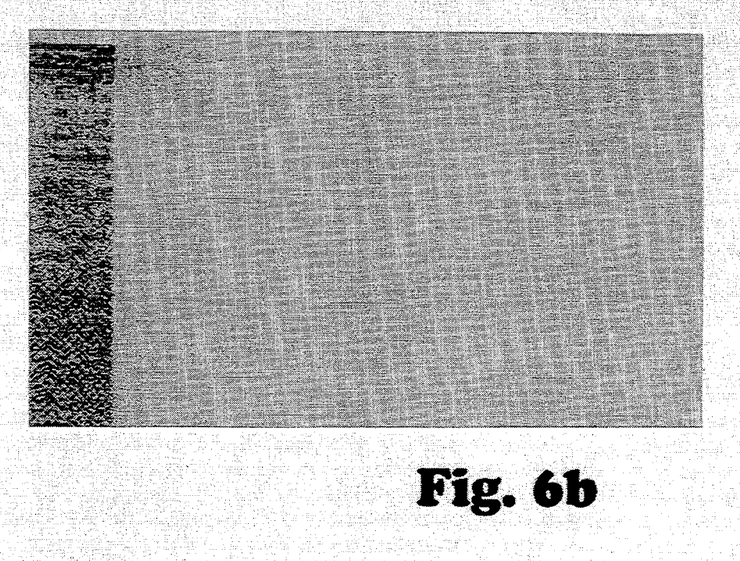
FIG. 6b is the same seismic line as shown on FIG. 6a, this time in the wavelet domain at three levels down. The section was originally computed in that domain and transformed back into the space domain to obtain FIG. 6a. The gain in computation time compared to direct space method is very high in this case, while some details are lost because of the threshold.
Figure 7A:
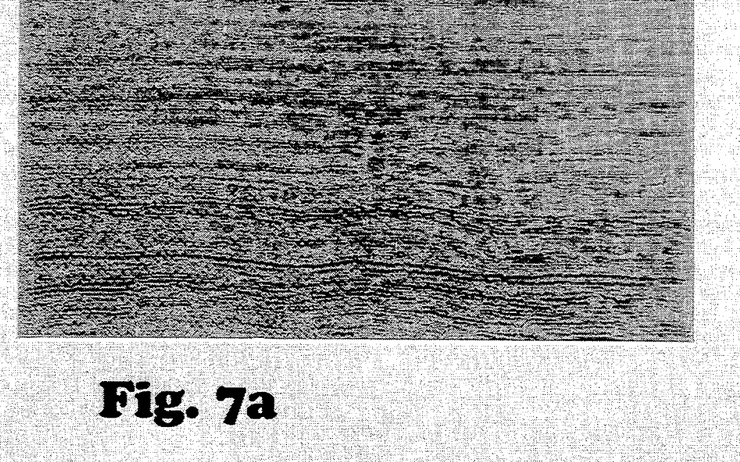
Figure 7B:
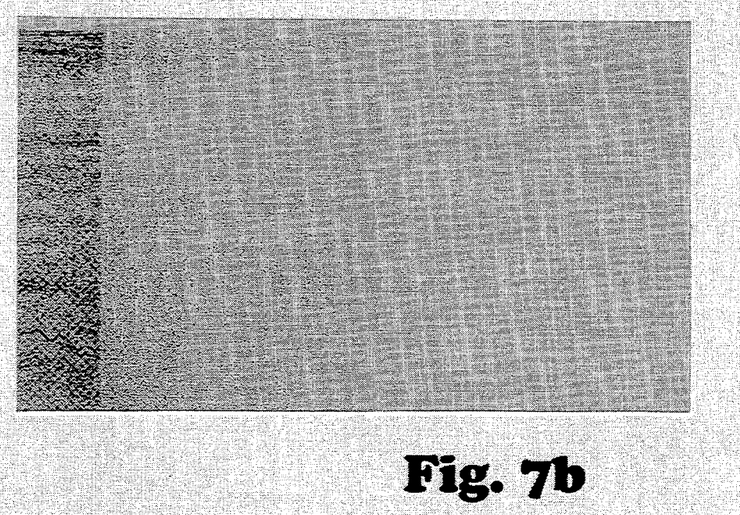
FIG. 7b is the same seismic line as in FIG. 7a, this time in the wavelet domain, at three levels down. The gain in computation is good and there is almost no loss of details.
Figure 8A:
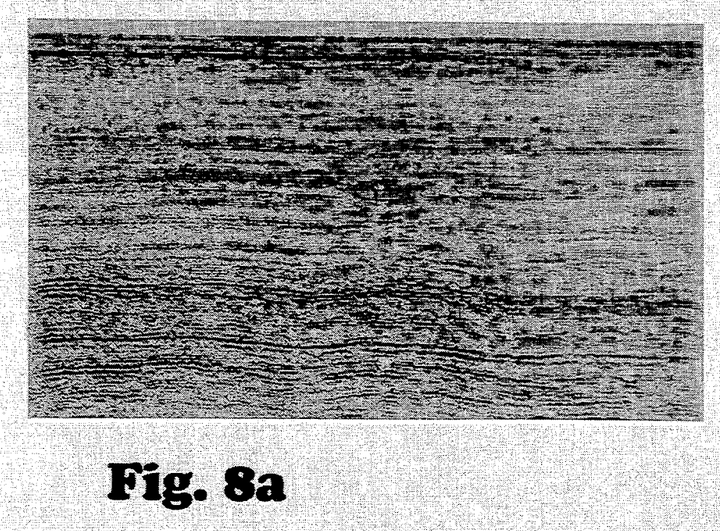
FIG. 8a is an illustration of a migration obtained for a threshold of 0.1 percent both in the operator and data. It is very similar to FIG. 7a, although the cost is eight times higher. This section is virtually identical to a zero threshold section.
Figure 8B:
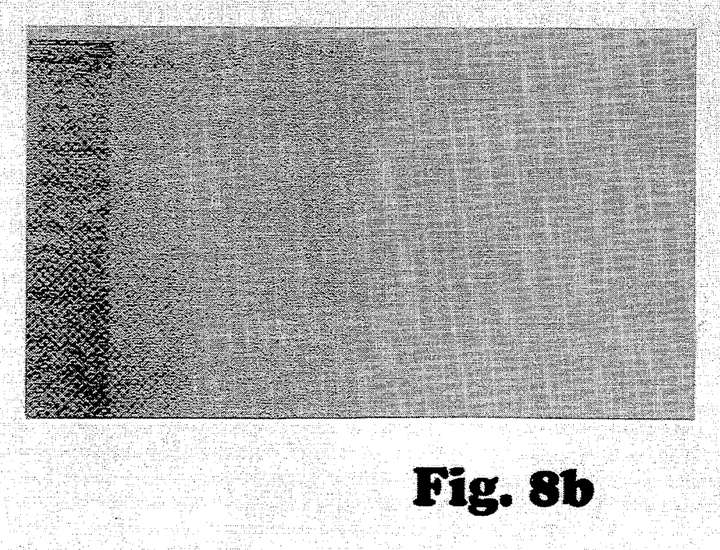
FIG. 8b is the same section as in FIG. 8a, in the wavelet domain.

To see how this is done, one must understand step by step how a discrete wavelet transform is performed on a series of points t(i) where i varies from 1 to $2^N$ and as shown in FIG. 5.

The Wavelet Transform Calculation

FIG. 5 provides a schematic representation of the computation of the wavelet transform of an eight point series over two levels. The black dots represent the low frequency parts of the wavelet transform of the signal, the white dots represent the high frequency parts. A few of the dots are labeled at each level. The computation of elements t1(2), h1(2), t2(2), and h2(2) are represented schematically. The lines join the low-frequency and high-frequency elements of the decomposed series at level 1 (t1) and level 2 (t2) to the low-frequency elements from which they are derived.

The case illustrated in FIG. 5 is that of the shortest of Daubechies wavelets, namely the four coefficients wavelet $D_2$. This involves four coefficients for the low-frequency part of the wavelet decomposition and four coefficients for the high-frequency part of the wavelet coefficients. The example provided is for a two level decomposition. A level of decomposition corresponds to applying both the low-pass and the high-pass filter and decimating by a factor of two. After the first level, the decomposition is done on the successive low-pass filtered sets.

The values of the Daubechies coefficients are given in the following table and names are assigned to each coefficient:

TABLE 1

| Low-frequency coefficients: | | | |
|---|---|---|---|
| s1 | s2 | s3 | s4 |
| −.129409522551 | .224143868042 | .836516303738 | .482962913145 |
| High-frequency coefficients: | | | |
| d1 | d2 | d3 | d4 |
| .482962913145 | −.836516303738 | .224143868042 | .129409522551 |

Note that the absolute values of the low-pass and high-pass coefficients are the same. The order of the high-pass coefficients is reversed from the order of the low-pass coefficients and their signs alternate. This is typical of quadrature mirror filters.

The first level of decomposition, or wavelet transform, is obtained in the following way: The first element of the low-frequency part of the transform is:

$$t1(1) = s1\ t(2^N - 1) + s2\ t(2^N) + s3\ t(1) + s4\ t(2) \tag{8}$$

The first element of the high frequency part of the transform is:

$$h1(1) = d1\ t(s^N - 1) + d2\ t(2^N) + d3\ t(1) + d4\ t(2) \tag{9}$$

This completes a periodization of the initial time series where elements at the end of the series have been folded back to the beginning of the series. The above expressions are simply the weighted sums of the two first and two last elements used as weights for the low frequency wavelet coefficients.

The second element of both the low and high parts of the transform are obtained by sliding the weighted sum by two points:

$$t1(2) = s1\ t(1) + s2\ t(2) + s3\ t(3) + s4\ t(4) \tag{10}$$

$$h1(2) = d1\ t(1) + d\ 2t(2) + d3\ t(3) + d4\ t(4) \tag{11}$$

FIG. 5 illustrates the computation of the elements for both the low-frequency and high-frequency part of the transform. The process is repeated, sliding the four points window by two points in order to compute the next coefficient on the low part and on the high part, until coefficients t1 ($2^{N-1}$) and h1($2^{N-1}$) are reached and computed. At this point, the computational result represents the decomposition of the original time series 'at one level down', (i.e., the t1 and h1 terms) consisting in $2^{N-1}$ low part coefficients and $2^{N-1}$ high part coefficients. The next step in computing the wavelet transform is to carry out the decomposition at the next level down.

The process starts from the $2^{N-1}$ low part coefficients obtained at the first level and involves an operation similar to the one described at the first level. For the low frequency component:

$$t2(1)=s1\ t1(2^{N-1}-1)+s2\ t1(2^{N-1})+s3\ t1(1)+s4\ t1(2) \quad (12)$$

Similarly, the first element of the high frequency part of the transform is:

$$h2(1)=d1\ t1(2^{N-1}-1)+d2\ t1(2^{N-1})+d3\ t1(1)+d4t1(2) \quad (13)$$

The second and subsequent elements for the t2 and h2 series are obtained from the elements of the t1 series in the same fashion as the t1 and h1 were obtained from the elements of the t series. FIG. 5 illustrates the computation of the second element of both the low frequency and high frequency parts of the transform. There will be $2^{N-2}$ elements in both t2 and h2. We now have a collection of points t2, h2, h1 with a total of $2^N$ elements.

The decomposition can be carried out all the way to a maximum number of levels until the low part and the high part of the decomposition contain only one element. This maximum number of levels is N. The total number of elements in the decomposition is still N, no matter what the number of levels in the decomposition (or transform) is.

The preceding example is an illustration of the method for the Daubechies wavelet of order 2, defined by two sets of four coefficients. The method to obtain wavelet transforms of higher order Daubechies wavelets is similar. The difference is that for a given order P, the number of coefficients involved is 2P.

For all orders of Daubechies wavelets, the transform is taken such that the two first points of the original series t(i) are included in the computation of t1 and h1, the other elements involved being the last 2P-2 elements of the t(i) series.

Application of Wavelet Transforms to Depth Migration

The downward continuation method used to perform the depth migration is a convolution method for each frequency component. The wavefield is assumed known at depth z. At depth $z+\Delta z$, it can then be expressed as follows:

$$F(z + \Delta z, x(i), \omega(j)) = \sum_{k=-L}^{L} H(v(i,z), x(i) - x(k), \omega(j)) F(z, x(k), \omega(j)) \quad (14)$$

where the notation to $\omega(j)$ refers to the jth frequency, v(i,z) refers to the velocity at depth z and ith position at that depth, x(i) is the x coordinate of the ith point.

Function F is the discretized wavefield expressed as a function of depth, frequency and x position. It is a complex number.

H is the discretized downward continuation operator in the space domain. It is a function of the velocity at the ith point at depth z, of the coordinate difference between point i and point k and of the jth frequency $\omega(j)$. H is an estimation over 2L+1 points of a Hankel function. It is also a complex number.

Equation (14) represents a convolution in the spatial domain (variable x) where the H denotes an operator. This can be expressed in matrix notation for each frequency as:

$$F(z+Dz)=HF(z) \quad (15)$$

where H is a banded matrix and F(z) is a vector representing the wavefield at depth z.

This convolution can also be expressed in the wavelet domain as:

$$W^T F(z+\Delta z)=(W^T H W)W^T F(z) \quad (16)$$

where $W^T$ represents the wavelet transform and W is the inverse wavelet transform.

$W^T$ is the wavelet transform of vector F, $(W^T H W)$ is the wavelet transform of matrix H.

Depth migration can be performed as a downward continuation problem in the frequency domain where each frequency component of the data is processed separately and all frequency components are stacked together to form the final image. As used herein, the term "stack" or "stacking" refers to summing the contributions from a plurality of receivers as the impulse source is moved from location to location.

Figure 4:
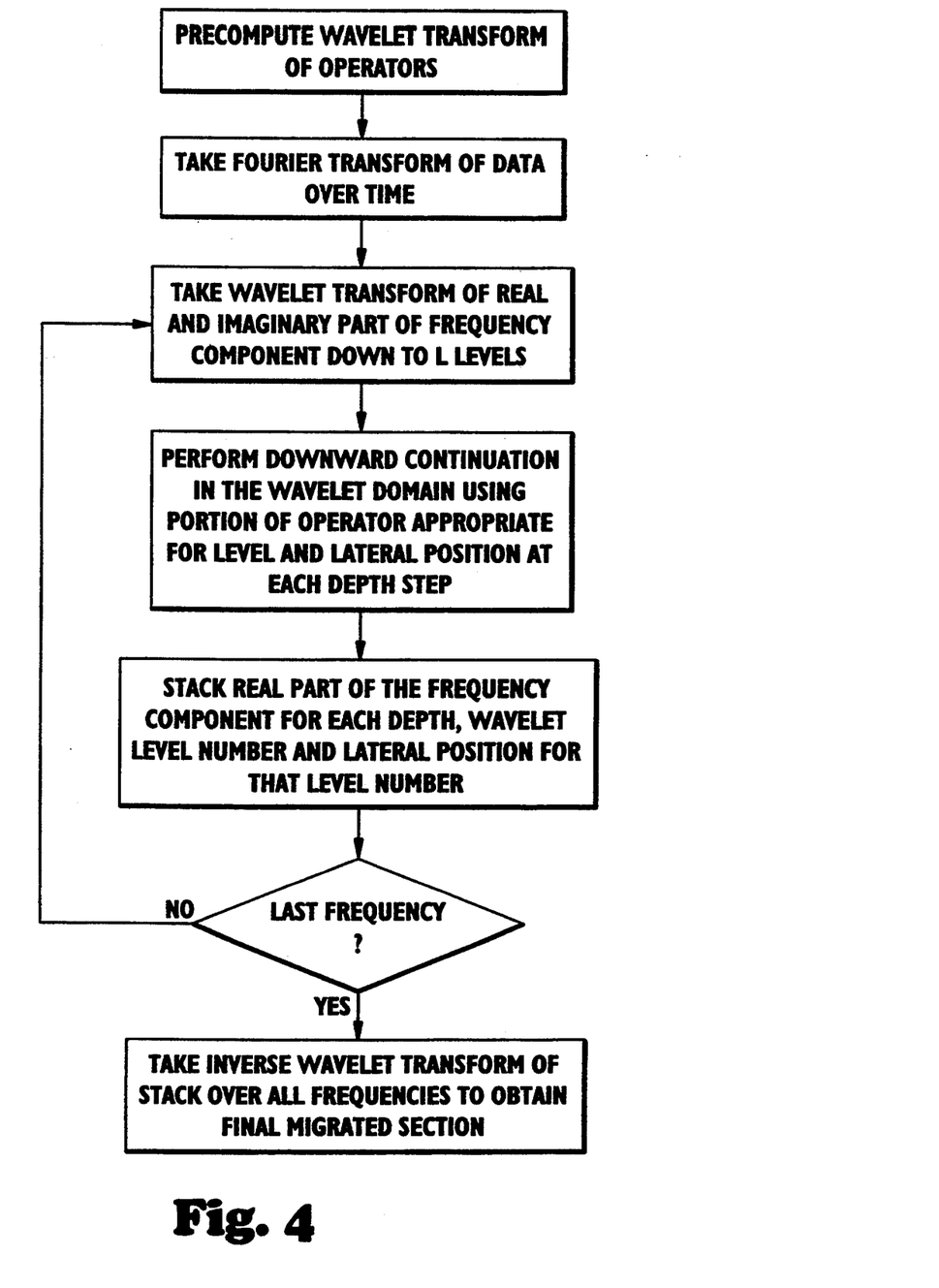
FIG. 4 is a logic flow diagram of the method of the present invention showing the steps of applying a wavelet transform to the downward continuation problem.

The downward continuation problem for one frequency component consists of a multiplication of a complex operator by a complex data vector at each depth step. The complex data vector is formed by the Fourier transform component at all positions along the seismic line. When this operation is performed in the wavelet domain, the extra step of taking the wavelet transform has to be considered. The steps of applying wavelet transform to the downward continuation problem, as shown in FIG. 4, are summarized below and explained in further detail later.

1. Precompute wavelet transform of downward continuation operators.
2. Take Fourier Transform of data over time.
3. For each frequency, take wavelet transform of data down to preset level NL.
4. For each frequency and all depth steps, perform the downward continuation in the wavelet domain keeping at each depth step wavelet coefficients larger than a preset percentage of the maximum of all spectra. The downward continuation is done using the operator in the wavelet domain.
5. Sum all frequency components at all depths in the wavelet domain or x.
6. Take the inverse wavelet transform of the wavelet domain image to get the spatial domain image.

1—Precomputation of wavelet transform of downward continuation operators

The first step in the method of the present invention is to precompute elements of wavelet transform of downward continuation operators for a number of values of normalized frequencies $\omega \Delta x/v$ and a requested number of levels NL. The number NL refers to the number of recurslye applications of the high and low frequency filters associated with the wavelet function. The operator is a two dimensional object. The wavelet transform on this two dimensional object is the tensor product of the one dimensional transforms. The one dimensional transform consists of an iterative application of a low-pass and a high-pass filter on a one dimensional real series. Starting with NT points, a low-pass filter is applied and decimation by two performed to obtain NT/2 points in the L part of the transform at the first level. Similarly a high-pass filter and decimation by two is performed to obtain the H part of the transform at the first level. The operation is repeated taking as input the L part of the transform to obtain the L and H parts at the next level.

The wavelet transform on the operator, a two dimensional object, is the tensor product of the one dimensional transforms. Through application of that transform, a four part operator is created at each level instead of two parts as in the one dimensional case. The four parts of the operator correspond to each of the parts of the tensor product, namely LL, HH, HL, and LH. For each level, three parts of the operators need to be computed. The three pans are LL, HH, HL. The LH coefficients are the reverse of the HL coefficients and need not be computed. The level zero operator, computed at the x discretization step of the data for a specific frequency, is obtained from its analytic expression. The operator used in practice is limited in its lateral extent either by tapering or truncation. Because of the special form of the downward continuation operator for a constant normalized frequency, namely that it is a circulant symmetric matrix, the two-dimensional transform can be performed simply as a one dimensional convolution and decimation. The convolution operator used to obtain the LL part of the operator is the autoconvolution of the low-pass filter. Similarly, the HH part is obtained from the autoconvolution of the high-pass filter. The convolution of the low-pass and high-pass one dimensional filters gives the filter used to obtain the HL part of the operator.

The wavelet transform is computed for a number of normalized frequencies taken to be at regular intervals between zero and the maximum normalized frequency to be encountered in the particular problem being examined. A typical number of normalized frequencies is one thousand to three thousand.

2—Time Fourier Transform

The next step is to take the Fourier Transform of the stacked section over the time coordinate. Starting with NT real numbers at each x location yields NT/2 complex numbers at the same x locations.

3—Wavelet transform over x coordinate

For each frequency, we have a series of complex numbers $W_i^0$, where the zero superscript refers to the starting level of discretization and subscript i refers to the x location of the coefficients. The next step is to take the Wavelet Transform over the x coordinate, NL levels down. Starting with NX complex numbers for a given frequency yields $2^{NL}$NX complex numbers $^sW_k^j$, j=0,NL, and $^dW_k^j$, j=1,NL. In this notation, the leading superscript refers to either the low frequency or high frequency parts of the decomposition. The low frequency part at each level is obtained by performing a convolution and decimation on the low frequency coefficients of the previous level using a set of coefficients as previously described. Similarly the high frequency coefficients are obtained by performing a convolution and decimation on the low frequency coefficients of the previous level using the related high frequency coefficients.

4—Downward continuation in the wavelet domain

Next, the downward continuation is done in the wavelet domain. The data in that domain is compressed by eliminating coefficients smaller than a preset percentage of the maximum of the spectrum. The downward continuation operator is applied only on the coefficients not eliminated at the compression phase. The portion of the operator applied to each data point is obtained from the precomputed table. The entry is chosen to correspond to the correct average velocity for the lateral position and the correct level. There is one approximation involved in this. The velocity is supposed to be approximately constant within an area whose size depends on the level considered. The appropriate velocity for a given level is taken to be an average of the velocity field over 2j grid points where j is the level number. The results of the downward continuation are stacked over frequency in the wavelet domain for each depth.

5—Sum all frequency components at all depths in the wavelet domain for x

The imaging condition used in this particular depth migration consists of summing all frequencies at all depth levels (i.e., the stacking operation). This is done in the wavelet domain for x. Steps 3–5 are repeated until all frequencies have been downward continued.

6—Take the inverse wavelet transform

The last step, once all frequencies have been downward continued, is to take the inverse wavelet transform over x to obtain the migrated section in depth and x.

The present invention is also adapted to using a modified Daubechies wavelet, adapting the wavelet for each frequency to further attenuate the non-diagonal elements in the operator.

FIGS. 6a, 6b, 7a, 7b, 8a, and 8b depict seismic lines in migrations (the "a" figures) and in the wavelet domain (the "b" figures) for various combinations of predetermined thresholds for retaining coefficients of the operator and data. These figures clearly illustrate the substantial reduction in data points for computation. These figures also provide those of skill in the art benchmarks from which to select such thresholds to improve calculation speed while maintaining adequate seismic display definition.

The principles, preferred embodiment and mode of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

We claim:

1. A method of processing seismic data including a collection of time/amplitude trace response functions located at least in one spatial dimension, and a velocity field function in another spatial dimension, to migrate said time/amplitude data into depth/amplitude data, comprising the steps of:
   (a) applying a wavelet transform to all frequency components of a velocity field downward continuation operator to define a downward continuation operator in the wavelet domain;
   (b) applying a wavelet transform of the spatial dimension to the collection of trace response functions, after the time/amplitude traces have been transformed through a standard fast Fourier transform method into transformed frequency/amplitude traces;
   (c) applying the operator obtained in step (a) for each frequency component to the transformed traces obtained in step, (b) to define a resultant collection of transformed traces in the wavelet domain for all desired depths;
   (d) applying the inverse wavelet transform on the spatial dimension, and defining the downward continued field in the spatial domain;

(e) summing all frequency components at all depths to define the resulting depth/amplitude data; and (f) displaying the amplitude of the resultant depth/amplitude data as a function of depth.

2. The method of claim 1 wherein said trace response function comprises a Common Depth Point seismic gather.

3. The method of claim 1 wherein said trace response function comprises a set of stacked trace functions.

4. The method of claim 1 wherein the resultant collection of transformed traces defined in step (c) comprises data and further including the step of compressing the data by eliminating coefficients smaller than a preset percentage of the maximum of the spectrum.

5. The method of claim 4 further comprising the step of repeating the processing of the seismic data with a different preset percentage of the maximum of the spectrum.

6. A method of processing seismic data at a plurality of frequencies including a collection of time/amplitude trace response functions and a velocity field function, to migrate said time/amplitude data into depth/amplitude data, comprising the steps of:

a. computing the wavelet transform of downward continuation operators;

b. taking the Fourier Transform of the time/amplitude trace response functions over time;

c. for each frequency taking the wavelet transform of data down to a preset level;

d. for each frequency and all depth steps, performing the downward continuation in the wavelet domain keeping at each depth step selected wavelet coefficients larger than a preset percentage of the maximum of all spectra;

e. summing all frequency components at all depths in the wavelet domain; and f. taking the inverse wavelet transform of the wavelet domain image to get the spatial domain image.

7. The method of claim 6 wherein said trace response function comprises a Common Depth Point seismic gather.

8. The method of claim 6 wherein said trace response function comprises a set of stacked trace functions.

* * * * *